US012062505B2

(12) United States Patent
Sato et al.

(10) Patent No.: US 12,062,505 B2
(45) Date of Patent: Aug. 13, 2024

(54) MOVEMENT MECHANISM AND INPUT DEVICE

(71) Applicant: Alps Alpine Co., Ltd., Tokyo (JP)

(72) Inventors: Takashi Sato, Miyagi-ken (JP); Akira Takeshita, Miyagi-ken (JP); Ayumu Anzai, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 51 days.

(21) Appl. No.: 17/880,733

(22) Filed: Aug. 4, 2022

(65) Prior Publication Data

US 2022/0375701 A1 Nov. 24, 2022

Related U.S. Application Data

(63) Continuation of application No. PCT/JP2020/048569, filed on Dec. 24, 2020.

(30) Foreign Application Priority Data

Mar. 17, 2020 (JP) ................................. 2020-046024

(51) Int. Cl.

*H01H 13/14* (2006.01)
*H01H 13/04* (2006.01)
*H01H 13/52* (2006.01)

(52) U.S. Cl.

CPC ............ *H01H 13/14* (2013.01); *H01H 13/04* (2013.01); *H01H 13/52* (2013.01); *H01H 2221/044* (2013.01)

(58) Field of Classification Search

CPC ........ H01H 13/14; H01H 13/04; H01H 13/52; H01H 2221/044; H01H 13/7073;

(Continued)

(56) References Cited

U.S. PATENT DOCUMENTS 11,636,990 B1 * 4/2023 Hsieh ..................... H01H 3/122 200/344
2009/0038922 A1 2/2009 Wang (Continued)

FOREIGN PATENT DOCUMENTS

CN 103871766 A 6/2014
CN 104074847 A 10/2014

OTHER PUBLICATIONS

International Search Report (English translation) for corresponding International Application No. PCT/JP2020/048569, mailed Mar. 16, 2021 (10 Pages).

(Continued)

*Primary Examiner* — Lheiren Mae A Caroc
(74) *Attorney, Agent, or Firm* — Harness, Dickey & Pierce, P.L.C.

(57) ABSTRACT

A movement mechanism includes: a case; a moving portion movable with respect to the case; and a support member that links the case and moving portion together and supports the moving portion so as to be movable with respect to the case. The support member has a plurality of pairs of first support portions and a plurality of pairs of second support portions, each of which is elastically deformable, has a plate-like shape, and extends between the case and the moving portion. The first support portions and second support portions are respectively placed on a first side and a second side in a moving direction of the moving portion so as to be symmetric with respect to the moving portion in plan view.

10 Claims, 10 Drawing Sheets

(58) Field of Classification Search
CPC ............... H01H 2221/024; H01H 3/12; H01H 2221/058; H01H 13/50; H01H 13/84; H01H 13/7065
See application file for complete search history.

(56) References Cited

U.S. PATENT DOCUMENTS

| | | | | |
|---|---|---|---|---|
| 2014/0158512 | A1 | 6/2014 | Kato | |
| 2014/0284193 | A1* | 9/2014 | Chou | H01H 13/705 200/5 A |
| 2014/0292013 | A1 | 10/2014 | Colombo et al. | |
| 2016/0079012 | A1* | 3/2016 | Hwa | H01H 13/64 200/5 A |
| 2017/0373687 | A1 | 12/2017 | Neugart | |

OTHER PUBLICATIONS

Office Action issued in the corresponding Chinese Patent Application No. 202080094479.3; dated Nov. 7, 2023 (total 6 pages).

* cited by examiner

MOVEMENT MECHANISM AND INPUT DEVICE

CLAIM OF PRIORITY

This application is a Continuation of International Application No. PCT/JP2020/048569 filed on Dec. 24, 2020, which claims benefit of Japanese Patent Application No. 2020-046024 filed on Mar. 17, 2020. The entire contents of each application noted above are hereby incorporated by reference.

BACKGROUND OF THE INVENTION

1. Field of the Invention

The present invention relates to a movement mechanism and an input device.

2. Description of the Related Art

A conventional switch module has a pair of flexible sheets attached to the upper surface and lower surface of a frame in a rectangular shape in plan view. When a manipulation surface disposed on the flexible sheet on the upper surface side is pressed, the pair of flexible sheets warp, which enables the manipulation surface to be moved downward. On the upper surface and lower surface, in a rectangular shape, of the frame, the pair of flexible sheets are bonded along two opposing edges of the four edges, and are not bonded along the remaining two edges of the four edges. When the manipulation surface is pressed, a shift does not occur in a direction toward the two edges to which the relevant flexible sheet is bonded because tension is evenly applied from both sides. However, a shift occurs in the direction toward the two edges to which neither of the flexible sheets is bonded because no tension is applied. To suppress a shift, therefore, a guide groove that restricts movement in the shift direction and a rib that moves upward and downward in the guide groove are disposed (Japanese Unexamined Patent Application Publication No. U.S. Pat. No. 10,298,233, for example).

SUMMARY OF THE INVENTION

With the conventional switch module, a guide groove and a rib are used to suppress a shift in the direction toward the two edges to which neither of the pair of flexible sheets is bonded. Therefore, there is the fear that if the dimensions of parts related to the guide groove and rib are not precise, when the manipulation surface is pressed, a rattle occurs in the direction toward the two edges to which neither of the flexible sheets is bonded or processing is not possible due to a too strong sliding load. Accordingly, to press the manipulation surface while it is kept in a horizontal state without being inclined, the precision of the constituent parts needs to be increased. This makes it difficult to take an easy-to-manufacture parts structure.

In view of this, the present disclosure provide a movement mechanism and an input device that enable a pressing manipulation while a horizontal state is maintained, with an easy-to-manufacture parts structure.

A movement mechanism in an embodiment of the present invention includes: a case; a moving portion movable with respect to the case; and a support member that functions as a link between the case and the moving portion and supports the moving portion so as to be movable with respect to the case. The support member has: a pair of first support portions that are elastically deformable and have a plate-like shape, the first support portions being placed on a first side in a moving direction of the moving portion, being placed point symmetrically with respect to the moving portion in plan view, and extending between the case and the moving portion; and a pair of second support portions that are elastically deformable and have a plate-like shape, the second support portions being placed on a second side in the moving direction of the moving portion, being placed point symmetrically with respect to the moving portion in plan view, and extending between the case and the moving portion. A plurality of pairs of first support portions are disposed, and a plurality of pairs of second support portions are provided.

The present disclosure can provide a movement mechanism and an input device that enable a pressing manipulation while a horizontal state is maintained, with an easy-to-manufacture parts structure.

DESCRIPTION OF THE PREFERRED EMBODIMENTS

Embodiments to which a movement mechanism and an input device in the present invention are applied will be described below.

Embodiments

Figure 1:
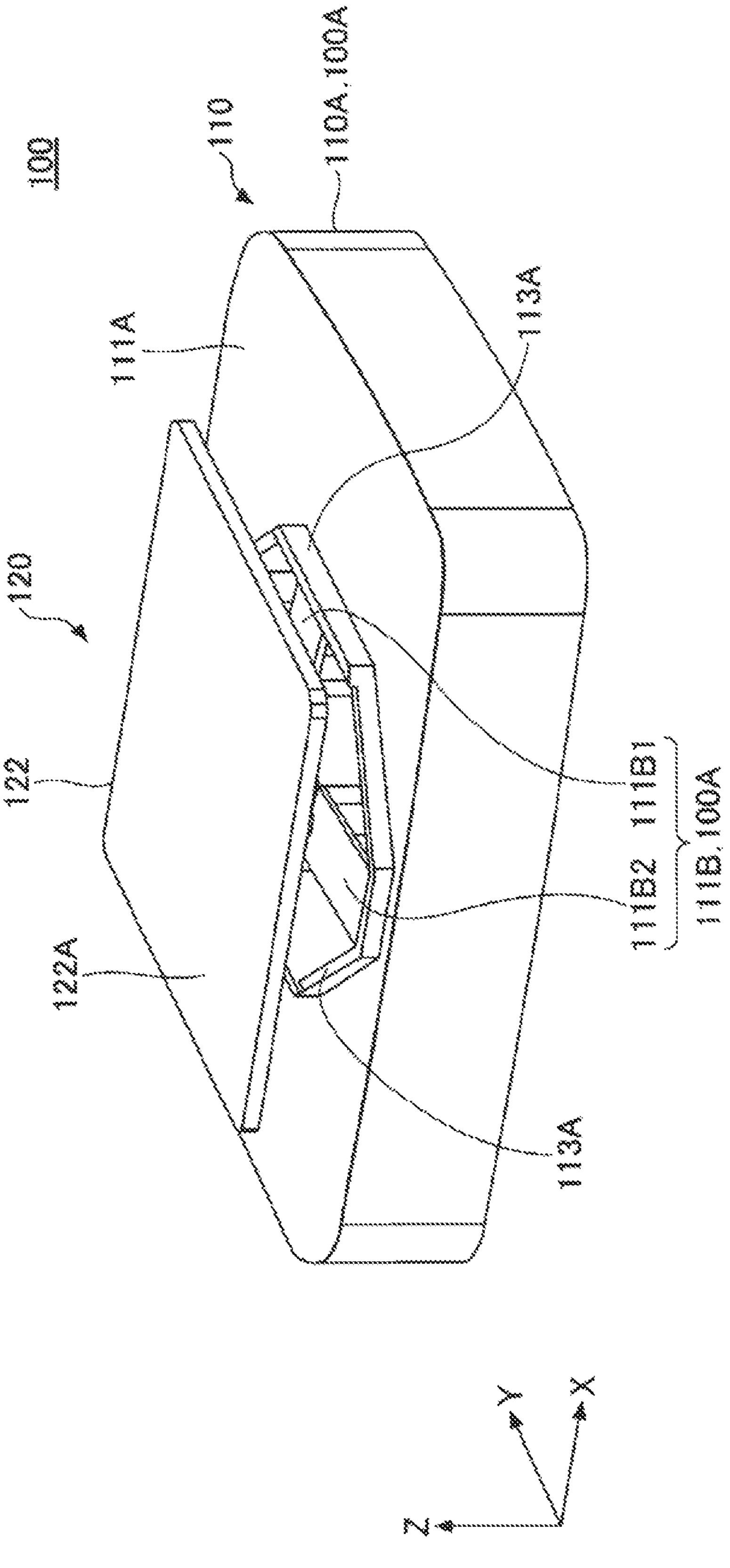
FIG. 1 illustrates an input device including a movement mechanism in an embodiment.

FIG. 1 illustrates an input device 100 including a movement mechanism in an embodiment. Descriptions will be given below with an XYZ coordinate system defined. In the descriptions below, a plan view will refer to an XY plan view. For convenience of explanation, the −Z-direction side will refer to the lower side or down and the +Z-direction side upper side will refer to the upper side or up. However, they do not represent a universal up-down relationship.

Figure 2:
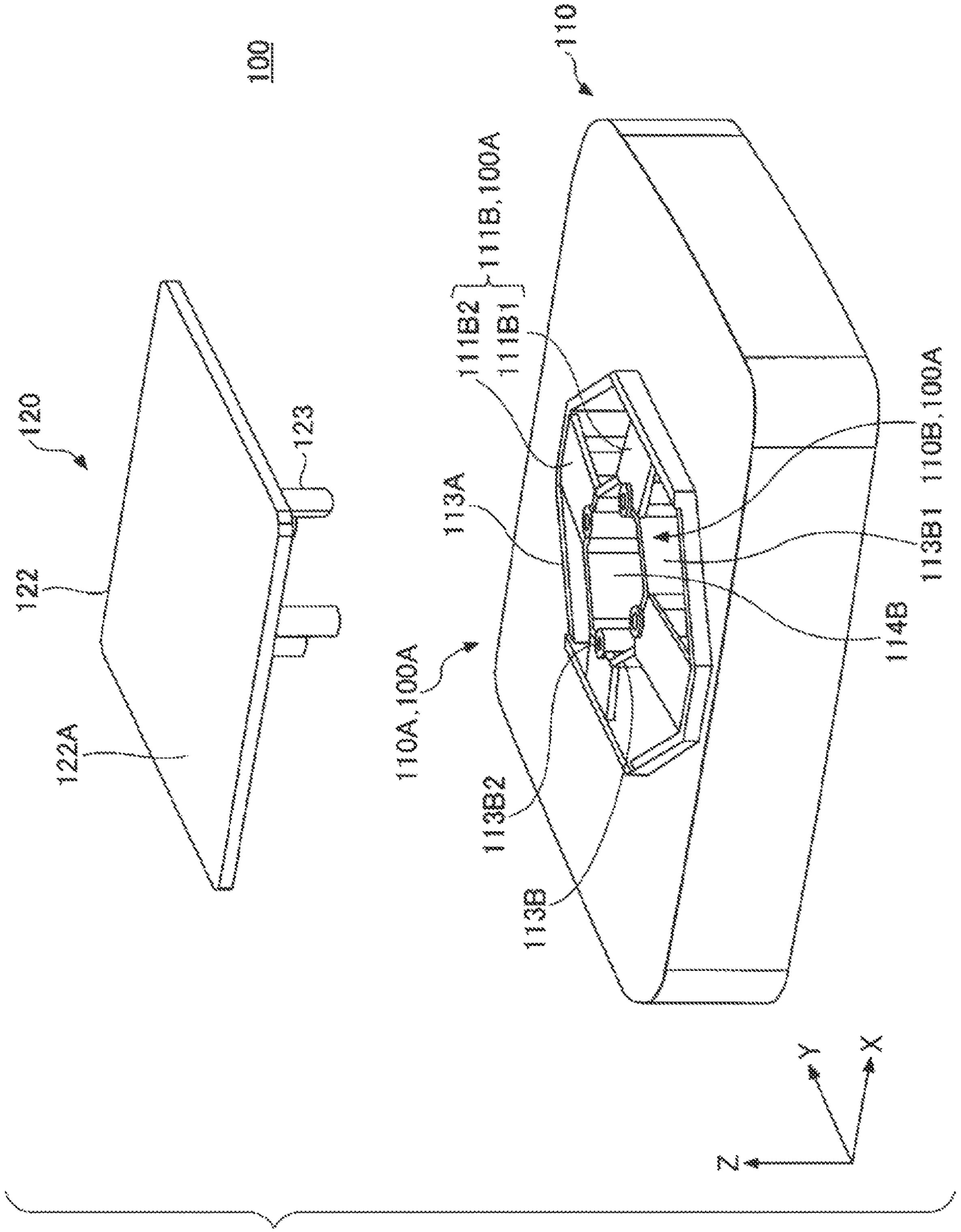
FIG. 2 is an exploded view of the input device.
Figure 3:
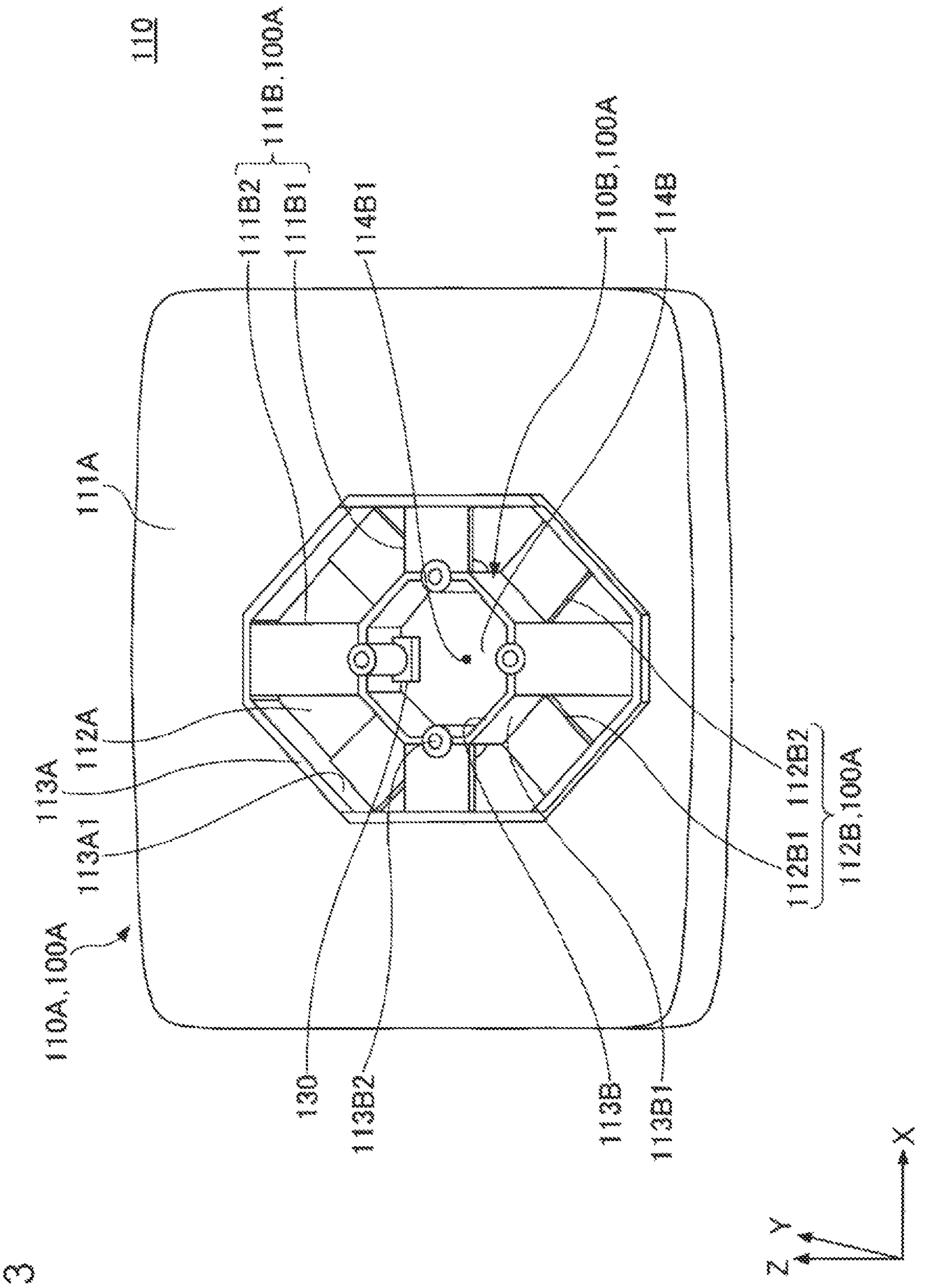
FIG. 3 illustrates a base.
Figure 4:
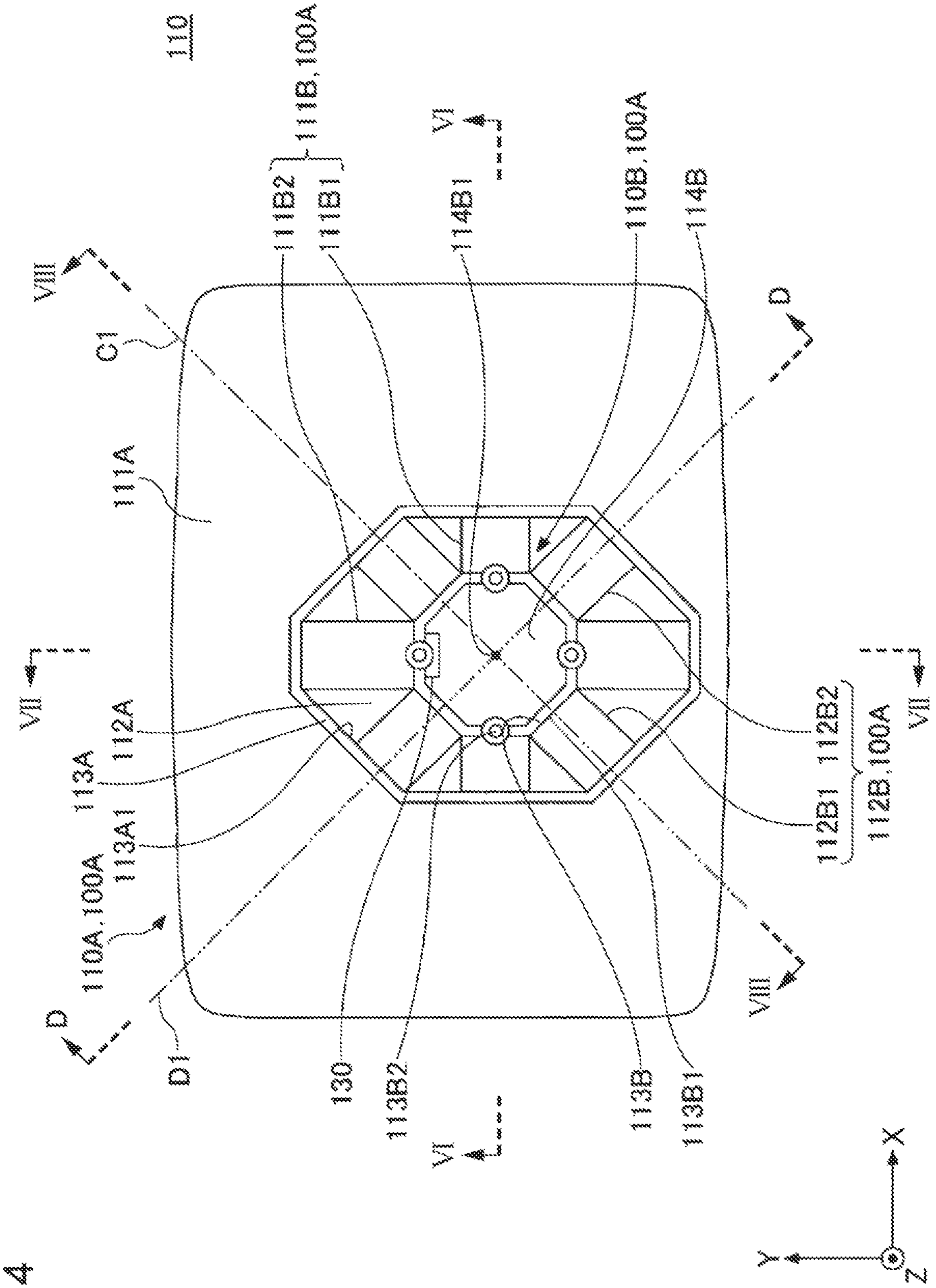
FIG. 4 also illustrates the base.
Figure 5:
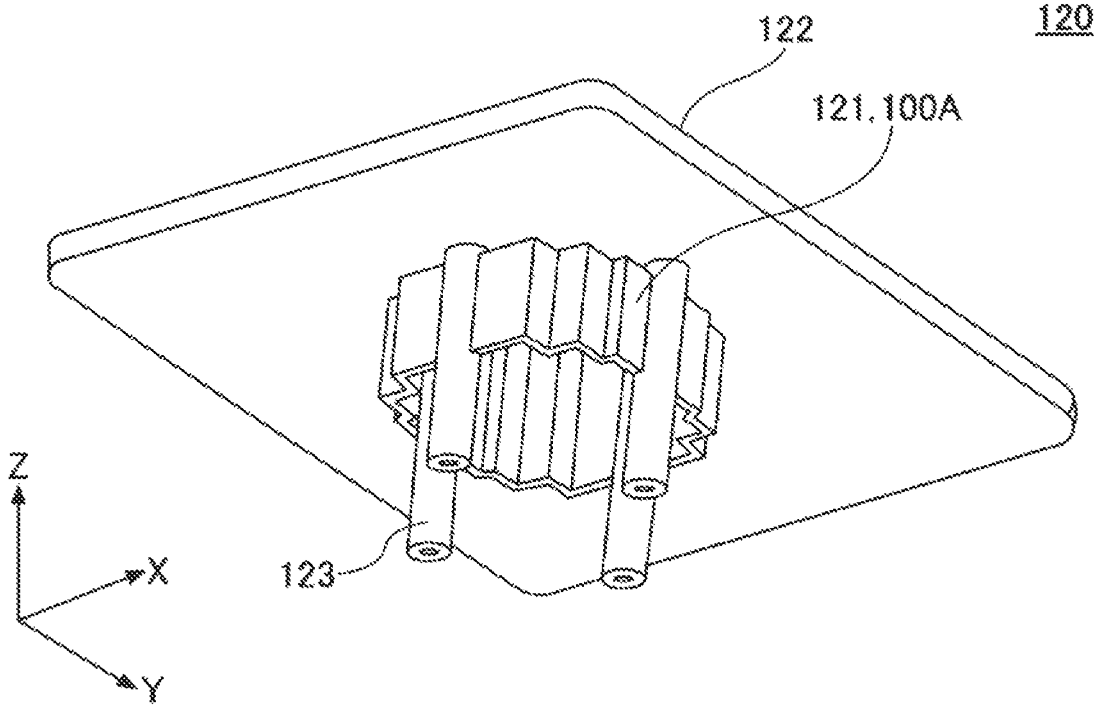
FIG. 5 illustrates a manipulation member.
Figure 6:
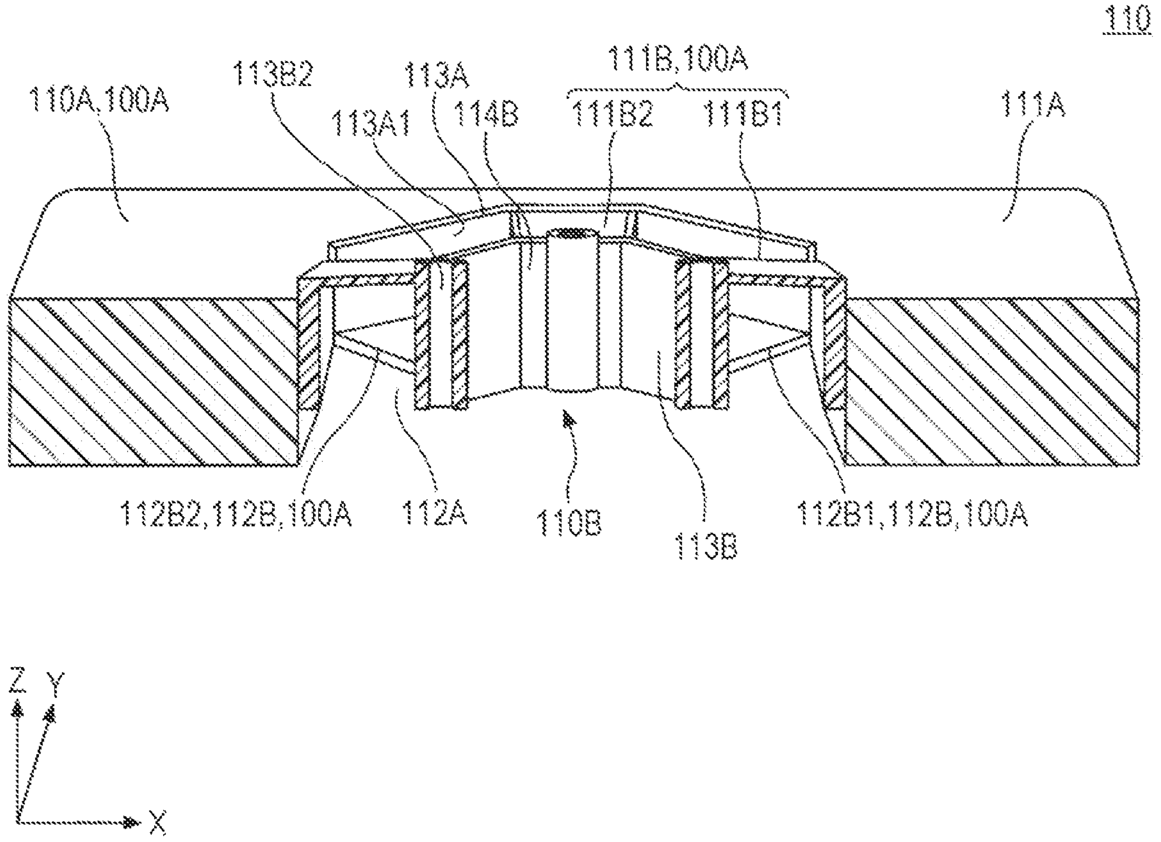
FIG. 6 is a sectional view along line VI-VI in FIG. 4.
Figure 7:
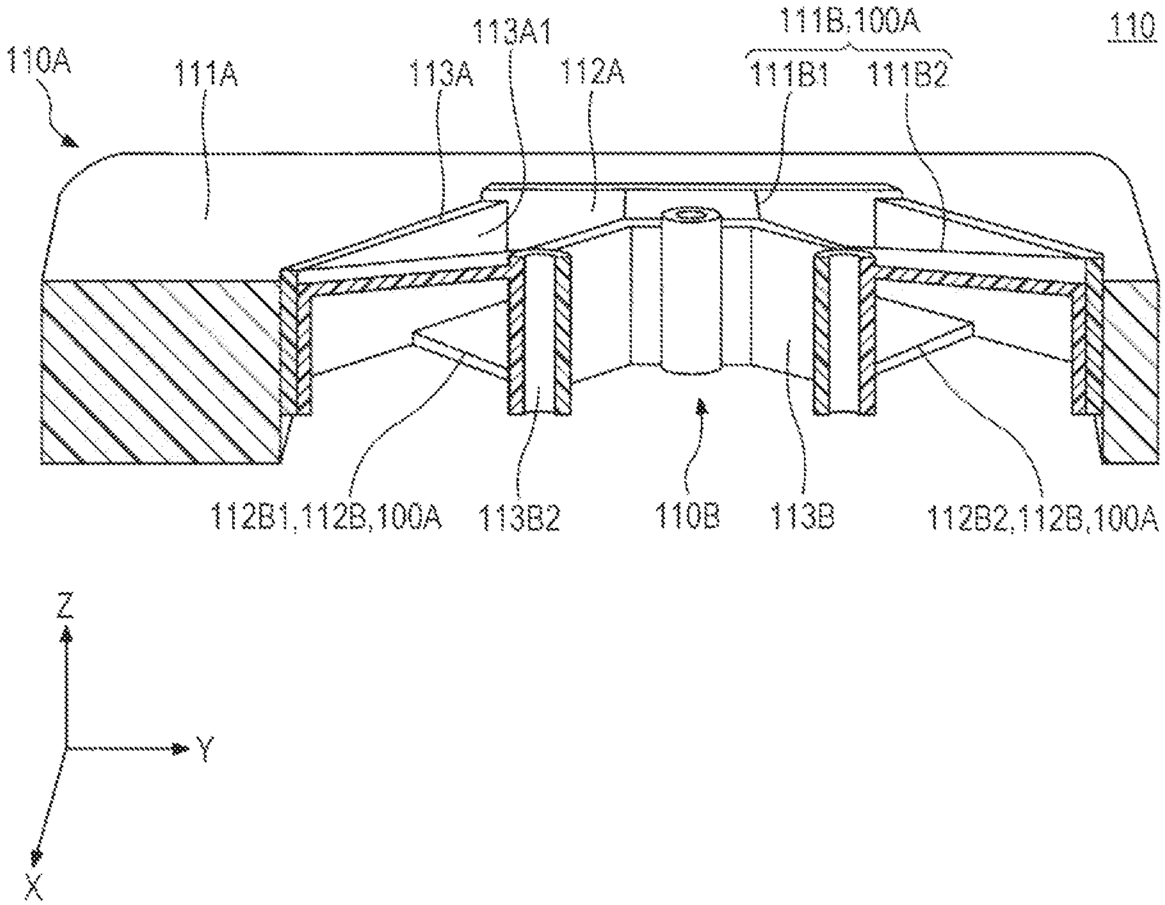
FIG. 7 is a sectional view along line VII-VII in FIG. 4.
Figure 8:
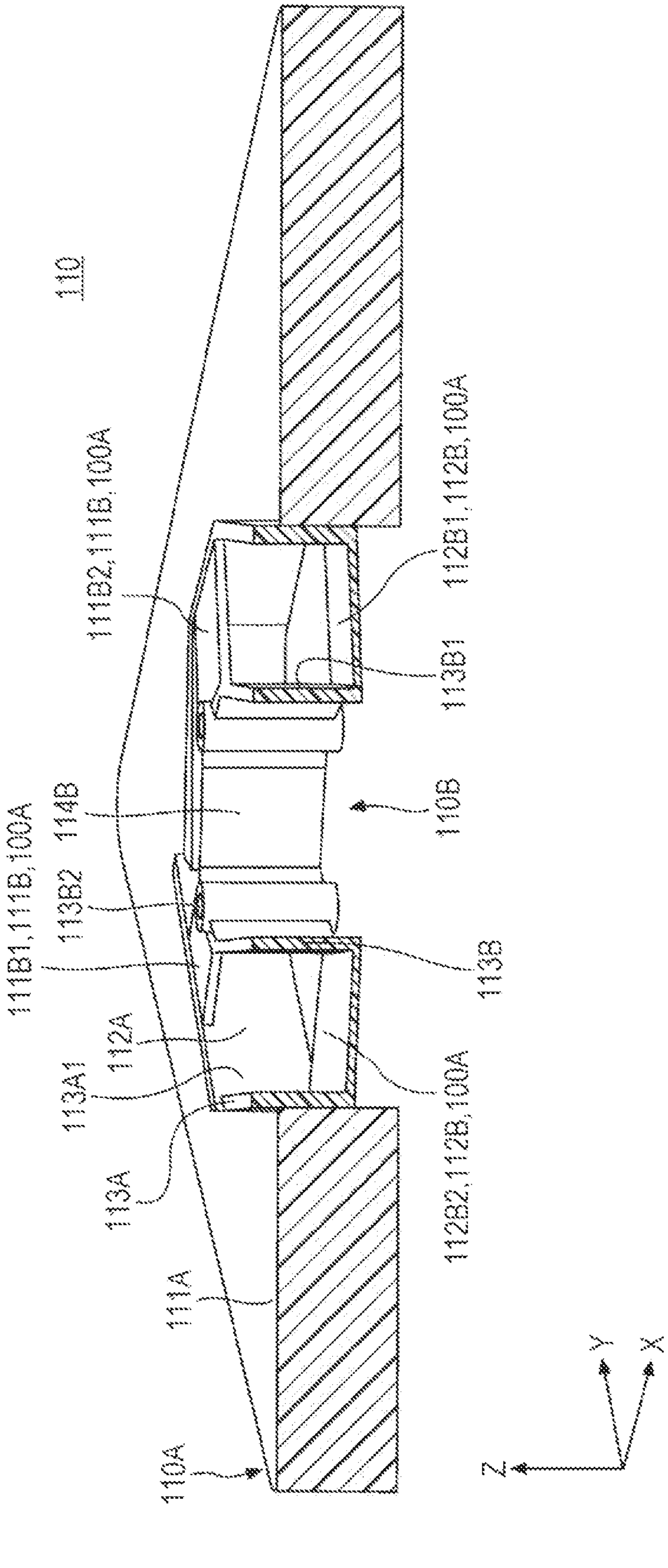
FIG. 8 is a sectional view along line VIII-VIII in FIG. 4.

The input device 100 includes a base 110 and a manipulation member 120. FIG. 2 is an exploded view of the input device 100. FIGS. 3 and 4 each illustrate the base 110. FIG. 5 illustrates the manipulation member 120. FIG. 6 is a sectional view along line VI-VI in FIG. 4. FIG. 7 is a sectional view along line VII-VII in FIG. 4. FIG. 8 is a sectional view along line VIII-VIII in FIG. 4. A cross section along line D-D in FIG. 4 will be omitted because the cross section is similar to the cross section along line VIII-VIII.

The input device 100 includes a sensor 130 illustrated in FIG. 3, besides the base 110 and manipulation member 120. The sensor 130 will be described later. A movement mechanism 100A in an embodiment includes a case 110A, a base portion 121, which is an example of a moving portion, and a support member 110B, which is an example of a support member. The support member 110B includes a support portion 111B, which is an example of a first support portion, and a support portion 112B, which is an example of a second support portion. In the drawings, therefore, the case 110A, support member 110B, support portions 111B and 112B, and base portion 121 are assigned the reference characters 100A.

The base 110 has the case 110A and support member 110B. The base 110 only needs that the support member 110B in particular is manufactured from an elastic material. The base 110 is integrally formed from an acrylonitrile-butadiene-styrene (ABS) resin, polycarbonate, a resin mixture of them, or the like, as an example. The base 110 is a portion that becomes the base portion of the input device 100.

The case 110A, which is a box-like member in a rectangular shape in plan view, has an upper surface 111A, a through-hole 112A, and a frame portion 113A. The through-hole 112A is formed at the central portion of the upper surface 111A. The through-hole 112A, which is octagonal in plan view as an example, passes through the case 110A in the Z direction. The through-hole 112A is longer in the Y direction than in the X direction as an example.

The frame portion 113A has inner walls enclosing the through-hole 112A, and also has a portion protruding from the upper surface 111A in the Z direction. The frame portion 113A is an octagonal ring-shaped wall portion, each two mutually facing planes of which are parallel, as an example. The frame portion 113A is longer than in the Y direction than in the X direction, as with the through-hole 112A. The frame portion 113A and through-hole 112A each may have the same length in the X direction and in the Y direction. In this case, the frame portion 113A and through-hole 112A become a regular octagon in plan view. The frame portion 113A and through-hole 112A may be in a polygonal shape other than an octagon shape. Alternatively, they may be circular or elliptical. The frame portion 113A may be formed integrally with the case 110A.

The support member 110B is disposed in the interior of the through-hole 112A in plan view. The support member 110B has a frame portion 113A, a frame portion 113B, and a through-hole 114B, besides the support portions 111B and 112B. The support member 110B functions as a link between the case 110A (frame portion 113A) and the base portion 121 (see FIG. 5) of the manipulation member 120 fixed to the frame portion 113B, and holds the base portion 121 of the manipulation member 120 so as to be movable in the Z direction with respect to the case 110A.

The support portion 111B is disposed further away on the +Z-direction side than the support portion 112B. One end of the support portion 111B is linked to the inner surface 113A1 of the frame portion 113A, and another end is linked to the outer surface 113B1 of the frame portion 113B. Here, the +Z-direction side is an example of a "first side in the movement direction of the moving portion", and the −Z-direction side is an example of a "second side in the movement direction of the moving portion". The inner surface 113A1 is a surface, of the frame portion 113A, facing the through-hole 112A. The outer surface 113B1 is a surface, of the frame portion 113B, facing the same side as the frame portion 113A. Since the base portion 121 (see FIG. 5) of the manipulation member 120 is fixed to the frame portion 113B, the other end of the support portion 111B is linked to the base portion 121 of the manipulation member 120 through the frame portion 113B. The support portion 111B includes two support portions 111B1 and two support portions 111B2. A combination of the two support portions 111B1 and two support portions 111B2 is an example of a plurality of pairs of first support portions and two pairs of first support portions. The two support portions 111B1 are an example of one of the two pairs of first support portions, and the two support portions 111B2 are an example of the other of the two pairs of first support portions.

The two support portions 111B1 and two support portions 111B2 are a thin-plate-like member in a substantially rectangular shape in plan view. They have the same thickness. Since the two support portions 111B1 and two support portions 111B2 are manufactured from an elastic material as part of the base 110, they can be elastically deformed by being warped in the Z direction between one end on the same side as the case 110A (frame portion 113A) and another end on the same side as the frame portion 113B.

The two support portions 111B1 are disposed along the X axis, one being on the +X-direction side of the frame portion 113B, the other being on the −X-direction side. The two support portions 111B1 are placed point symmetrically with respect to the center, in plan view, of the base portion 121 (see FIG. 5) of the manipulation member 120, which is fitted to the interior of the through-hole 114B inside the frame portion 113B. The center of the base portion 121 (see FIG. 5) of the manipulation member 120 in plan view matches the center 114B1 of the through-hole 114B in plan view.

The one end of the support portion 111B1 on the same side as the case 110A may be more greatly offset toward the −Z-direction side than the other end on the same side as the frame portion 113B. That is, the one end of the support portion 111B1 on the same side as the case 110A is at a lower position than the other end on the same side as the frame portion 113B, and the support portion 111B1 is thus linearly inclined downward from the other end on the same side as the frame portion 113B toward the one end on the same side as the case 110A. Since the through-hole 112A is longer in the Y direction than in the X direction, the two support portions 111B1 are shorter than the two support portions 111B2.

The one end of the support portion 111B1 on the same side as the case 110A is linked to the upper end of the inner surface 113A1 of the frame portion 113A, and the other end of the support portion 111B1 on the same side as the frame portion 113B is linked to the upper end of the outer surface 113B1 of the frame portion 113B. Therefore, the upper end of the frame portion 113B more greatly protrudes upward than the upper end of the frame portion 113A. The outer surface 113B1 is a surface, of the frame portion 113B, facing the same side as the frame portion 113A.

The two support portions 111B2 are disposed along the Y axis, one being on the +Y-direction side of the frame portion 113B, the other being on the −Y-direction side. The two support portions 111B2 are placed point symmetrically with respect to, the center, in plan view, of the base portion 121 (see FIG. 5) of the manipulation member 120, which is fitted to the interior of the through-hole 114B inside the frame portion 113B. The center of the base portion 121 (see FIG. 5) of the manipulation member 120 in plan view matches the center 114B1 of the through-hole 114B in plan view.

The one end of the support portion 111B2 on the same side as the case 110A may be more greatly offset toward the −Z-direction side than the other end on the same side as the frame portion 113B. That is, the one end of the support portion 111B2 on the same side as the case 110A is at a lower position than the other end on the same side as the frame portion 113B, and the support portion 111B2 is thus linearly inclined downward from the other end on the same side as the frame portion 113B toward the one end on the same side as the case 110A. Since the through-hole 112A is longer in the Y direction than in the X direction, the two support portions 111B2 are longer than the two support portions 111B1.

When no particular distinction is made between the two support portions 111B1 and two support portions 111B2, they will be referred to below as the support portion 111B.

The support portion 112B is disposed further away on the −Z-direction side than the support portion 111B. One end of the support portion 112B is linked to the inner surface 113A1 of the frame portion 113A, and another end is linked to the outer surface 113B1 of the frame portion 113B. Since the base portion 121 (see FIG. 5) of the manipulation member 120 is fixed to the frame portion 113B, the other end of the support portion 112B is linked to the base portion 121 of the manipulation member 120 through the frame portion 113B.

The support portion 112B includes two support portions 112B1 and two support portions 112B2. A combination of the two support portions 112B1 and two support portions 112B2 is an example of a plurality of pairs of second support portions and two pairs of second support portions. The two support portions 112B1 are an example of one of the two pairs of second support portions, and the two support portions 112B2 are an example of the other of the two pairs of second support portions.

The two support portions 112B1 and two support portions 112B2 are thin-plate-like members in a substantially rectangular shape in plan view. They have the same thickness. Since the two support portions 112B1 and two support portions 112B2 are manufactured from an elastic material as part of the base 110, they can be elastically deformed by being warped in the Z direction between one end on the same side as the case 110A and another end on the same side as the frame portion 113B.

The two support portions 112B1 are disposed along an axis C1 obtained by rotating the X axis counterclockwise by 45 degrees in plan view, with the frame portion 113B switched in plan view. The axis C1 is included in a plane that produces the cross section along line VIII-VIII. The two support portions 112B1 may be placed as described above so as not to overlap the support portions 111B in plan view by shifting the angles of the support portions 112B1 in plan view with respect to the support portion 111B.

The two support portions 112B1 are placed point symmetrically with respect to the center, in plan view, of the base portion 121 (see FIG. 5) of the manipulation member 120, which is fitted to the interior of the through-hole 114B inside the frame portion 113B. The center of the base portion 121 (see FIG. 5) of the manipulation member in plan view 120 matches the center 114B1 of the through-hole 114B in plan view.

The one end of the support portion 112B1 on the same side as the case 110A may be more greatly offset toward the +Z-direction side than the other end on the same side as the frame portion 113B. That is, the one end of the support portion 112B1 on the same side as the case 110A is at a higher position than the other end on the same side as the frame portion 113B, and the support portion 112B1 is thus linearly inclined upward from the other end on the same side as the frame portion 113B toward the one end on the same side as the case 110A. The length of the two support portions 112B1 is equal to the length of the two support portions 112B2.

The one end of the support portion 112B1 on the same side as the case 110A is linked to the lower end of the inner surface 113A1 of the frame portion 113A, and the other end of the support portion 112B1 on the same side as the frame portion 113B is linked to the lower end of the outer surface 113B1 of the frame portion 113B. Therefore, the lower end of the frame portion 113B more greatly protrudes downward than the lower end of the frame portion 113A.

The two support portions 112B2 are disposed along an axis D1 passing through the center 114B1 in plan view, the axis D1 being obtained by rotating the X axis clockwise by 45 degrees in plan view, with the frame portion 113B switched. The axis D1 is included in a plane that produces the cross section along line D-D. The two support portions 112B2 may be placed as described above so as not to overlap the support portions 111B in plan view by shifting the angles of the support portions 112B2 in plan view with respect to the support portion 111B.

The two support portions 112B2 are placed point symmetrically with respect to the center, in plan view, of the base portion 121 (see FIG. 5) of the manipulation member 120, which is fitted to the interior of the through-hole 114B inside the frame portion 113B. The center of the base portion 121 (see FIG. 5) of the manipulation member in plan view 120 matches the center 114B1 of the through-hole 114B in plan view. The one end of the support portion 112B2 on the same side as the case 110A may be more greatly offset toward the +Z-direction side than the other end on the same side as the frame portion 113B. That is, the one end of the support portion 112B2 on the same side as the case 110A is at a higher position than the other end on the same side as the frame portion 113B, and the support portion 112B2 is thus linearly inclined upward from the other end on the same side as the frame portion 113B toward the one end on the same side as the case 110A.

When no particular distinction is made between the two support portions 112B1 and two support portions 112B2, they will be referred to below as the support portion 112B.

The frame portion 113B is a frame-like member in a regular octagonal shape in plan view, which is held by the support portions 111B1 and 111B2 and the support portions 112B1 and 112B2. The frame portion 113B extends in the Z direction, the upper end of which is linked to the support portions 111B1 and 111B2 and the lower end of which is linked to the support portions 112B1 and 112B2.

The frame portion 113B is placed so that the centers of the frame portion 113B and the frame portion 113A of the case 110A match in plan view. The frame portion 113B is placed so that each of its eight edges is parallel to the relevant opposing edge of the eight edges of the frame portion 113A of the case 110A.

The two support portions 111B1 are linked to the upper ends of two edges of the frame portion 113B, the two edges being parallel to the Y axis in plan view. The two support portions 111B2 are linked to the upper ends of two edges of the frame portion 113B, the two edges being parallel in the X direction in plan view.

The two support portions 112B1 are linked to the lower ends of two edges of the frame portion 113B, the two edges being positioned on the axis C1 in plan view. The two support portions 112B2 are linked to the lower ends of two edges of the frame portion 113B, the two edges being positioned on the axis D1 in plan view.

The two support portions 111B1, two support portions 111B2, two support portions 112B1, and two support portions 112B2 are linked to the eight edges of the frame portion 113B. Since the frame portion 113B is an octagon in plan view as illustrated in FIG. 4, the two support portions 111B1, two support portions 111B2, two support portions 112B1, and two support portions 112B2 evenly extend radially from the eight edges of the frame portion 113B toward the outside. An angle between each two adjacent support portions of the two support portions 111B1, two support portions 111B2, two support portions 112B1, and two support portions 112B2 is 45 degrees.

Between the frame portion 113A and the frame portion 113B, the two support portions 111B1, two support portions 111B2, two support portions 112B1, and two support portions 112B2 are placed so that the upper side and on the lower side alternate. The frame portion 113B has four through-holes 113B2 formed in four edges to which the support portions 111B1 and 111B2 are linked, each through-hole 113B2 extending in the Z direction. Screws (not illustrated) used to screw and fix the tops of the four legs 123 of the manipulation member 120 are fitted into the four through-holes 113B2 from below.

The width of the support portion 111B1 in the Y direction is equal to the lengths of two edges of the frame portion 113B, the two edges being parallel to the Y axis in plan view, as an example. The width of the support portion 111B2 in the X direction is equal to the lengths of two edges of the frame portion 113B, the two edges being parallel to the X axis in plan view, as an example.

The width of the support portion 112B1 with respect to the axis C1 is equal to the lengths of two edges of the frame portion 113B, the two edges being positioned on the axis C1 in a plan view, as an example. The width of the support portion 112B2 with respect to the axis D1 is equal to the lengths of two edges of the frame portion 113B, the two edges being positioned on the axis D1 in a plan view, as an example.

An aspect will be described here in which the support portions 111B and 112B are linked to the base portion 121 through the frame portion 113B. However, the support member 110B may not include the frame portion 113B and the support portions 111B and 112B may be linked directly to the base portion 121.

As for the frame portion 113A of the case 110A, the two support portions 111B1 are linked to the upper ends at the central portions of two edges of the frame portion 113A, the two edges being parallel to the Y axis in plan view. The two support portions 111B2 are linked to the upper ends of two edges of the frame portion 113A, the two edges being parallel to the X direction in plan view. The lengths of two edges of the frame portion 113A, the two edges being parallel to the X direction in plan view, and the widths of the two support portions 111B2 are substantially equal.

The two support portions 112B1 are linked to the lower ends of two edges of the frame portion 113A, the two edges being positioned on the axis C1 in plan view. The two support portions 112B2 are linked to the lower ends of two edges of the frame portion 113A, the two edges being positioned on the axis D1 in plan view.

The through-hole 114B is formed inside the frame portion 113B. The through-hole 114B has an opening that is a regular octagon in plan view and passes through the center of the support member 110B in the Z direction. The through-hole 114B has the center 114B1. The center 114B1 matches the center of the base portion 121 (see FIG. 5) of the manipulation member 120 in plan view.

With the support member 110B having a structure as described above, when a Z-direction force is applied to the frame portion 113B, the two support portions 111B1, two support portions 111B2, two support portions 112B1, and two support portions 112B2, each two of which are placed point symmetrically, symmetrically warp. Therefore, the same tension is applied from both sides in each of a plurality of directions, so straight movement (shift) is possible while a horizontal state is maintained with respect to the case 110A.

The manipulation member 120 has a manipulation portion 122 besides the base portion 121 and legs 123. The base portion 121 is an example of the moving portion movable with respect to the case 110A. The base portion 121 is fitted into the through-hole 114B formed inside the frame portion 113B of the support member 110B. The four legs 123 are also fitted into the four through-holes 113B2 in the frame portion 113B. Since the base portion 121 is fitted into the through-hole 114B and the four legs 123 are fitted into the four through-holes 113B2, the manipulation member 120 is fixed to the support member 110B.

The manipulation portion 122, which is in a flat plate shape, is provided integrally with the base portion 121 and legs 123. The base portion 121 and legs 123 are disposed on the lower surface of the manipulation portion 122. Although the manipulation portion 122 is formed integrally with the base portion 121 and legs 123 as an example, the manipulation portion 122 may be a separate part such as, for example, a touch pad having a capacitive touch function. The upper surface of the manipulation portion 122 is a manipulation surface 122A, which is pressed downward by the user.

When the manipulation surface 122A of the manipulation portion 122 is pressed downward, a downward force is applied to the frame portion 113B of the support member 110B and the support portions 111B and 112B, which are placed point symmetrically, symmetrically warp as described above. Therefore, the same tension is applied to the manipulation member 120 from both sides in each of a plurality of directions, so straight downward movement is possible while a horizontal state is maintained with respect to the base 110.

The sensor 130, which is an example of a detection unit, is placed below the frame portion 113B. On a surface (not illustrated) of a member such as a circuit board on which the input device 100 is placed, the sensor 130 is placed below the frame portion 113B as an example.

When the manipulation surface 122A of the manipulation portion 122 is pressed downward and the manipulation member 120 moves downward with respect to the base 110, the lower end of the frame portion 113B presses the sensor 130. The sensor 130 detects that it has been pressed by the frame portion 113B. The sensor 130 of this type may be any sensor if it can detect pressing by the frame portion 113B. Examples usable as the sensor 130 include a limit switch and a conductivity sensor that changes from a non-conductive state to a conductive state by being pressed.

By detecting pressing by the frame portion 113B, the sensor 130 detects the movement of the manipulation portion 122 or the base portion 121 used as an example of the moving portion.

Figure 9:
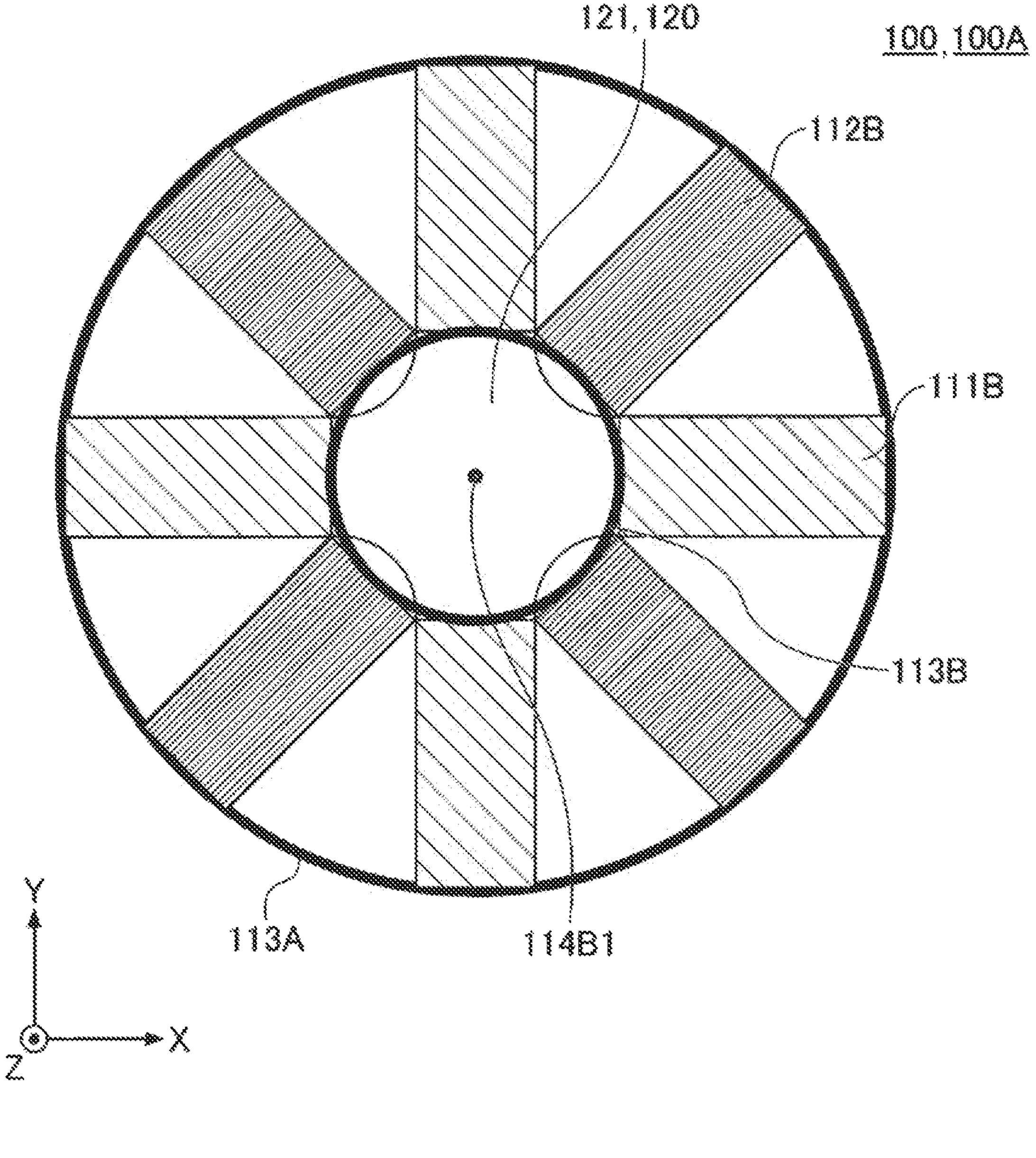
FIG. 9 schematically illustrates a movement mechanism and the input device.
Figure 10:
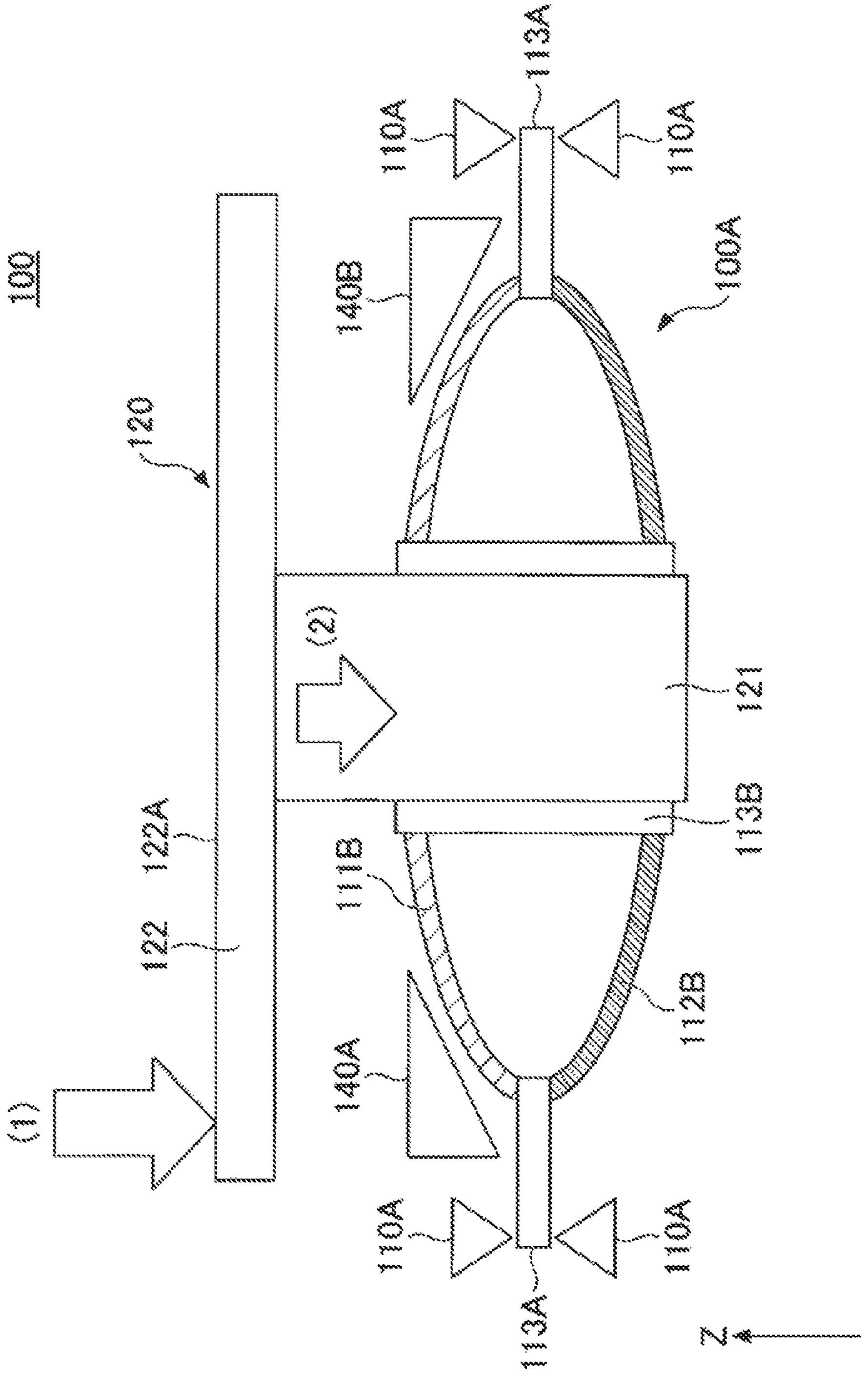
FIG. 10 also schematically illustrates the movement mechanism and input device.

Next, the operation of the movement mechanism 100A and input device 100 will be described with reference to FIGS. 9 and 10. FIGS. 9 and 10 schematically illustrate the movement mechanism 100A and input device 100. FIG. 9 illustrates the frame portion 113A, base portion 121, support portions 111B and 112B, and frame portion 113B of the input device 100 in plan view. In FIG. 9, the through-hole 114B is omitted, but the center 114B1 of the through-hole 114B is indicated instead. The center 114B1 of the through-hole 114B in plan view matches the center of the base portion 121 of the manipulation member 120 in plan view.

FIG. 10 further illustrates the case 110A, manipulation member 120, manipulation portion 122, manipulation surface 122A, and devices 140A and 140B in a cross-sectional view. In FIG. 10, the support portions 111B and 112B are illustrated in the same cross section for easy understanding of the positional relationship between the support portions 111B and 112B in the up-down direction. The support portions 111B and 112B may not be linear but may be curved. In FIG. 10, therefore, the support portions 111B and 112B are illustrated in a state in which they are curved.

Here, the operation of the movement mechanism 100A will be described. However, the description below similarly applies to the input device 100 including the movement mechanism 100A.

With the movement mechanism 100A, a total of eight deformable support portions 111B and 112B link the frame portion 113A and frame portion 113B together.

When a downward force is applied to the manipulation surface 122A as indicated by arrow (1) in FIG. 10, a downward force is applied to the frame portion 113B through the base portion 121 as indicated by arrow (2). At this time, the eight support portions 111B and 112B warp in such a way that the same side as the frame portion 113B is lowered downward with respect the frame portion 113A used as a fixed point, so the base portion 121 moves downward with respect to the case 110A.

As described above, the four support portions 111B are placed point symmetrically with respect to the center 114B1 and the four support portions 112B are placed point symmetrically with respect to the center 114B1. Therefore, the force with which the base portion 121 is pressed downward is evenly applied to both sides in the direction for each of the four support portions 111B and to both sides in the direction for each of the four support portions 112B.

Thus, a reaction force due to the tension of the support portion 111B is also evenly exerted from both side in each direction, so the base portion 121 can move downward with the manipulation surface 122A maintained in a horizontal state without the base portion 121 being inclined.

Therefore, it is possible to provide the movement mechanism 100A and input device 100 that enable a pressing manipulation while a horizontal state is maintained, with an easy-to-manufacture parts structure due to a combination of simple parts. There is no need to use a component, for which high precision is required, of the type to restrict movement directions with a guide groove and a rib.

Thus, the manufacturing of parts is eased because, for example, yield is raised. As a result, the costs of parts can be lowered.

The movement mechanism 100A may have, as the four support portions 111B, two pairs of support portions 111B (one pair of support portions 111B1 and one pair of support portions 111B2), which are placed point symmetrically with respect to the center 114B1. The extending direction of the one pair of support portions 111B1 and the extending direction of the other pair of support portions 111B2 may be orthogonal in plan view.

Thus, the pressing force is evenly distributed and the movement mechanism 100A can thereby be provided that can more certainly maintain a horizontal state at the time of pressing. Another advantage is that a horizontal state at the time of pressing can be more certainly maintained with a few number of support portions 111B. The support portion 111B may have a structure in which only either of one pair of support portions 111B1 and one pair of support portions 111B2 is included.

The movement mechanism 100A may have, as four support portions 112B, two pairs of support portions 112B (one pair of support portions 112B1 and one pair of support portions 112B2), which are placed point symmetrically with respect to the center 114B1. The extending direction of the one pair of support portions 112B1 and the extending direction of the other pair of support portions 112B2 may be orthogonal in plan view.

Thus, the pressing force is evenly distributed and the movement mechanism 100A can thereby be provided that can more certainly maintain a horizontal state at the time of pressing. Another advantage is that a horizontal state at the time of pressing can be more certainly maintained with a few number of support portions 112B. The support portion 112B may have a structure in which only either of one pair of support portions 112B1 and one pair of support portions 112B2 is included.

Although an aspect has been described here in which the movement mechanism 100A includes two pairs of support portions 111B, the movement mechanism 100A may have a structure in which three or more pairs of support portions 111B, the extending directions of which mutually differ, are included. This is because with a structure with three or more pairs, a horizontal state at the time of pressing can be more certainly maintained.

Although an aspect has been described here in which the movement mechanism 100A includes two pairs of support portions 112B, the movement mechanism 100A may have a structure in which three or more pairs of support portions 112B, the extending directions of which mutually differ, are included. This is because with a structure with three or more pairs, a horizontal state at the time of pressing can be more certainly maintained.

There may be a difference between the number of pairs of support portions 111B and the number of pairs of support portion 112B. This is because the number of pairs may differ if a horizontal state at the time of pressing can be more certainly maintained.

Since the extending directions of the support portions 111B and the extending directions of the support portions 112B may differ from each other in plan view, the support portions 111B on the upper side and the support portions 112B on the lower side support the frame portion 113B multi-directionally in plan view with respect to the frame portion 113A, so a more stable state can be maintained at the time of pressing.

Since the support portions 111B and support portions 112B are integrally formed, the assembling of the support portions 111B and support portions 112B is not necessary and the assembly cost can be lowered.

Since the support portions 111B and support portions 112B are placed so as not to overlap each other in plan view, forming is possible with upper and lower punching dice, which do not use a slide core structure, so die costs and costs of parts can be lowered.

As described above, the one end of the support portion 111B on the same side as the case 110A may be more greatly offset toward the −Z-direction side than the other end on the same side as the frame portion 113B, so the one end on the same side as the case 110A is at a lower position than the other end on the same side as the frame portion 113B. Also, as described above, the one end of the support portion 112B on the same side as the case 110A may be more greatly offset toward the +Z-direction side than the other end on the same side as the frame portion 113B, so the one end on the same side as the case 110A is at a higher position than the other end on the same side as the frame portion 113B.

Thus, a free space is obtained at the top and bottom on the same side as the case 110A, and the devices 140A and 140B can be placed in the upper space, for example. Although the devices 140A and 140B may be any type, if a light emitting diode (LED) that emits light toward the upper side is placed, for example, the manipulation surface 122A can be illuminated from the inside of the input device 100. In addition, when the devices 140A and 140B of this type are placed in the interior of the input device 100, the input device 100 can be made compact.

This completes the description of the movement mechanism and input device in an exemplary embodiment of the present invention. The present invention is not limited to a concretely disclosed embodiment. Various variations and modifications are possible without departing from the intended scope of the claims of the present invention.

For example, in this embodiment, the support portion 111B on the upper side and the support portion 112B on the lower side have been placed in an aspect in which they approach each other toward the outside. However, they may be placed in an aspect in which they are parallel to each other. Conversely, they may be placed in an aspect in which they are separated toward the outside.

In this embodiment, the support portion 111B on the upper side and the support portion 112B on the lower side have been fixed and linked by forming them integrally with the frame portion 113A and frame portion 113B. However, each of the support portions 111B and 112B may be a separate part and may be fixed and linked by a means such as bonding or thermal welding.

This international application claims priority based on Japanese Patent Application No. 2020-046024 filed on Mar. 17, 2020, and the entire contents of the application are incorporated in this international application by reference in it.

What is claimed is:

1. A movement mechanism comprising:

a case;

a moving portion movable with respect to the case; and a support member that functions as a link between the case and the moving portion and supports the moving portion so as to be movable with respect to the case, wherein the support member has a plurality of pairs of first support portions that are elastically deformable and a plurality of pairs of second support portions that are elastically deformable, each of the first support portions is plate-shaped and extends between the case and the moving portion, and each of the second support portions is plate-shaped and extends between the case and the moving portion, the plurality of pairs of first support portions are placed at a first side in a moving direction of the moving portion and are placed point symmetrically with respect to the moving portion in a plan view, and the plurality of pairs of second support portions are placed at a second side in the moving direction of the moving portion and are placed point symmetrically with respect to the moving portion in the plan view.

2. The movement mechanism according to claim 1, wherein the plurality of pairs of first support portions further comprises two pairs of first support portions, and an extending direction of a first pair of the two pairs of first support portions and an extending direction of a second pair of the two pairs of first support portions are orthogonal to each other in the plan view.

3. The movement mechanism according to claim 1, wherein the plurality of pairs of second support portions further comprises two pairs of second support portions, and an extending direction of a first pair of the two pairs of second support portions and an extending direction of a second pair of the two pairs of second support portions are orthogonal to each other in the plan view.

4. The movement mechanism according to claim 1, wherein the plurality of pairs of first support portions further comprises three or more pairs of first support portions, and extending directions of the three or more pairs of first support portions are mutually different.

5. The movement mechanism according to claim 1, wherein the plurality of pairs of second support portions further comprises three or more pairs of second support portions, and extending directions of the three or more pairs of second support portions are mutually different.

6. The movement mechanism according to claim 1, wherein each of extending directions of the plurality of pairs of first support portions and each of extending directions of the plurality of pairs of second support portions are mutually different.

7. The movement mechanism according to claim 1, wherein the case and the support member are formed integrally.

8. The movement mechanism according to claim 7, wherein the plurality of pairs of first support portions and the plurality of pairs of second support portions are placed so as not to overlap each other in the plan view.

9. The movement mechanism according to claim 1, wherein:

a first end of each of the first support portions directly adjacent to the case is more greatly offset toward the second side than a second end of each of the first support portions directly adjacent to the moving portion; and a first end of each of the second support portions directly adjacent to the case is more greatly offset toward the first side than a second end of each of the second support portions directly adjacent to the moving portion.

10. An input device comprising:

the movement mechanism according to claim 1;

a manipulation portion provided integrally with the moving portion, the manipulation portion undergoing a pressing manipulation from the first side toward the second side; and a detection unit that detects movement of the moving portion or of the manipulation portion.

* * * * *